United States Patent Office 3,511,850
Patented May 12, 1970

3,511,850
THIAZOLIUM METAL SALT COMPLEXES
Walter Reifschneider, Midland, Mich., assignor to The Dow Chemical Company, Midland, Mich., a corporation of Delaware
No Drawing. Filed Oct. 27, 1966, Ser. No. 589,859
Int. Cl. C07d 91/32, 91/42
U.S. Cl. 260—299
12 Claims

ABSTRACT OF THE DISCLOSURE

Complex of (A) a thiazolium compound of the formula

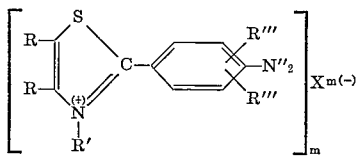

wherein X represents a pharmaceutically-acceptable anion; each R independently represents hydrogen or loweralkyl, or both R moieties, taken together, represent straight chain alkylene being of from 3 to 6, both inclusive, carbon atoms; R' represents primary loweralkyl; each R'' independently represents hydrogen or primary loweralkyl; each R''' independently represents hydrogen, bromo, chloro, methoxy or methyl; and $m$ represents an integer equal to the valence of the anion X; and (B) a metal salt compound of the formula $$M_aY_b$$

wherein M represents $copper^{(+)}$, $copper^{(++)}$, $iron^{(++)}$, $iron^{(+++)}$, $antimony^{(+++)}$, $bismuth^{(+++)}$, $tin^{(++)}$, $manganese^{(++)}$, $zinc^{(++)}$ or cadmium; Y represents a pharmaceutically-acceptable anion; and each of $a$ and $b$ represents an integer such that ($a$ times the valence of M) is equal to ($b$ times the valence of Y). These complexes are useful as agents for regulating the growth of plants.

This invention is directed to a thiazolium compound which is a member selected from the group consisting of a material of structural Formula I:

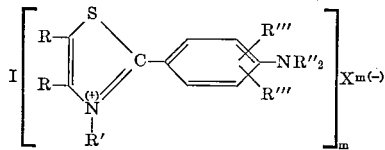

its complex with a phenolic compound; its complex with a urea compound; and its complex with a metal salt compound. The term "thiazolium compound" is employed herein to describe a product or products of this definition, only. In the above and succeeding formulae, X represents a pharmaceutically acceptable anion; R, each being taken separately, represents a member selected from the group consisting of hydrogen and loweralkyl, or both R moieties, taken together, represent straight-chain alkylene being of from 3 to 6, both inclusive, carbon atoms; R' represents primary loweralkyl; each R'' independently represents a member selected from the group consisting of hydrogen and primary loweralkyl; each R''' independently represents a member selected from the group consisting of hydrogen, bromo, chloro, methoxy and methyl; and $m$ represents an integer equal to the valence of the anion X.

The term "phenolic compound" is employed in the present specification and claims to designate a compound of the following formula only:

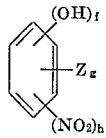

wherein each Z independently represents, subject only to known factors of steric hindrance, a member selected from the group consisting of halo, alkyl, and loweralkoxy; the symbol $f$ represents an integer of from 1 to 6, both inclusive; the symbol $g$ represents an integer of from 0 to 5, both inclusive; and the symbol $h$ represents an integer of from 0 to 2, both inclusive, the sum of $f$, $g$ and $h$ being an integer of from 1 to 6, both inclusive. The term "alkyl" is employed in the present specification and claims to designate an alkyl radical being of from 1 to 6, both inclusive, carbon atoms.

Representative phenolic compounds include phenol, p-iodophenol, p-nitrophenol, pyrocatechol, resorcinol, hydroquinone, pyrogallol, 1,2,4-benzenetriol, phloroglucinol, 1,2,4,5-benzenetetrol, benzenehexol, o-methoxyphenol, 2,4,5-trichlorophenol, 2,4-dinitrophenol, m-cresol, p-cresol, 4-n-hexylresorcinol, cresol, 4-bromo-m-cresol, 4-ethylresorcinol, tetrachloropyrocatechol, 4-nitropyrocatechol, 2,5-dimethoxyhydroquinone, trichloropyrogallol, and dimethylphloroglucinol.

In the present specification and claims, the term "urea compound" is employed to designate only a member selected from the group consisting of urea, thiourea, guanidine, guanidine hydrochloride, and biuret; and the term "metal salt compound" is employed only to designate a compound of the formula $$M_aY_b$$

wherein M represents a member selected from the group consisting of $copper^{(+)}$, $copper^{(++)}$, $iron^{(++)}$, $iron^{(+++)}$, $antimony^{(+++)}$, $bismuth^{(+++)}$, $tin^{(++)}$, $manganese^{(++)}$, $zinc^{(++)}$, and $cadmium^{(++)}$; Y represents a pharmaceutically acceptable anion; and each of $a$ and $b$ represents an integer such that ($a$ times the valence of M) is equal to ($b$ times the valence of Y).

In the present specification and claims, the unmodified term "loweralkyl" is employed to designate alkyl radicals being of from 1 to 4, both inclusive, carbon atoms. The term "primary loweralkyl" designates an alkyl radical being of from 1 to 4, both inclusive, carbon atoms, and having a $CH_2$ group at the point of attachment. Thus, the term "primary loweralkyl" designates methyl, ethyl, n-propyl, n-butyl, and isobutyl. As employed in the present specification and claims, the term "halide" designates appearances of chlorine, bromine, and iodine atoms, only.

In the instance of a complex with phenolic compound, urea compound, or metal salt compound, such complex generally forms as a 1:1 complex, that is, one molecule of material of Formula I and one molecule of complexing agent (phenolic compound, urea compound, or metal salt compound); as a 2:1 complex, that is, two molecules of material of Formula I and one molecule of complexing agent; or as a 1:2 complex, that is, two molecules of complexing agent and one molecule of material of Formula I. Complexes having other ratios can be prepared and also are comprehended within the definition of thiazolium compound of the present invention. It is noted that inasmuch as the material of Formula I has $m$ units of the positive radical defined there by the parentheses, a 1:1 complex comprises more than one such positive radical whenever $m$ represents an integer in excess of 1.

Hence, the complex of the material of Formula I with the phenolic compound, the urea compound, or the metal salt compound can be described, in an alternate expression, as being most frequently of the following formula:

$$[G]_d \cdot [Z']_e$$

wherein G, in each of its $d$ occurrences, represents the same material of Formula I; Z′, in each of its $e$ occurrences, represents the same member selected from the group consisting of the phenolic compound, the urea compound, and the metal salt compound; and each of $d$ and $e$ represents an integer being of from 1 to 2, both inclusive, the sum of $d$ and $e$ being an integer of from 2 to 3, both inclusive.

In the instance of a complex with a metal salt compound, each of the units which constitute the complex, that is, (A) the material of Formula I and (B) the metal salt compound, comprises an anion. These anions are interchangeable. Therefore, in an alternate expression applicable to the metal salt complexes, these complexes can be described as being of the following structural formula

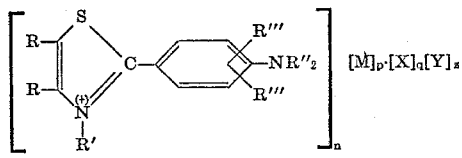

in which each of $n$, $p$, $q$, and $z$ is an integer and $[n+(p$ times the valency of M$)]$ is equal to the value of $[(q$ times the valence of X$)+(z$ times the valence of Y$)]$. In a preferred embodiment of such complexes, the anions X and Y are identical.

The primary attribute of the pharmaceutically-acceptable anion (X and also, in the instance of the metal salt complexes, Y) is non-toxicity. The choice of the anion is not critical, although a given anion may in some instances exhibit special advantages, due to solubility, ease of crystallization, lack of objectionable taste and the like. Representative pharmaceutically acceptable anion moieties include the following: chloride, bromide, iodide, sulfate, bisulfate, acetate, salicylate, valerate, oleate, phenate, laurate, borate, benzoate, lactate, diglycollate, phosphate, phenylethylbarbiturate, o-acetoxybenzoate, citrate, dialkylbarbiturate, sulfathiazole, theophyllinate, urate, maleate, fumarate, succinate, tartrate, diethylbarbiturate, penicillinate, camphorate, carbonate, cacodylate, aconitate, sulfamate, gentisate, malate, cinnamate, stearate, and the like.

Hence, representative metal salt complexes to be employed in accordance with the present invention are those of a given product of Formula I and each of the following metal salt compounds:

Antimony acetate, antimony trichloride, antimony tribromide, antimony triiodide, antimony sulfate, antimony tartrate, bismuth acetate, bismuth benzoate, bismuth tribromide, bismuth trichloride, bismuth citrate, bismuth triiodide, bismuth lactate, bismuth salicylate, bismuth sulfate, bismuth tartrate, cupric acetate, cuprous acetate, cupric benzoate, cuprous bromide, cupric bromide, cupric butyrate, cuprous chloride, cupric chloride, cupric citrate, cuprice formate, cupric glyceride, cupric lactate, cupric laurate, cupric oleate, cupric salicylate, cupric stearate, cuprous sulfate, cupric sulfate, cuprous sulfite, cupric tartrate, ferrous acetate, ferric acetate, ferric benzoate, ferrous bromide, ferric bromide, ferrous carbonate, ferrous chloride, ferric chloride, ferric citrate, ferric formate, ferrous iodide, ferrous lactate, ferric lactate, ferric malate, ferric oleate, ferrous sulfate, ferric sulfate, ferrous tartrate, manganese acetate, manganese benzoate, manganese bromide, manganese chloride, manganese citrate, manganese formate, manganese iodide, manganese lactate, manganese othrophosphate, manganese metasilicate, manganese sulfate, manganese tartrate, manganese valerate, stannous acetate, stannous bromide, stannous chloride, stannous chromate, stannous iodide, stannous orthophosphate, stannous sulfate, stannous tartrate, zinc acetate, zinc aluminate, zinc benzoate, zinc borate, zinc bromide, zinc butyrate, zinc caproate, zinc carbonate, zinc chloride, zinc chromate, zinc citrate, zinc formate, zinc iodide, zinc lactate, zinc laurate, zinc oleate, zinc salicylate, zinc stearate, zinc sulfate, zinc sulfite, and zinc tartrate.

The thiazolium compound of the present invention can exist as a hydrate, ordinarily as a hemihydrate, monohydrate, or dihydrate, and it is frequently convenient to prepare and separate a given product as a hydrate. Sometimes the hydrate contains a higher proportion of water per molecule of complex, such as 2 to 10 moles of water per mole of complex. Also, the products, particularly those in which X, or one or both of X and Y in the instance of the metal salt complexes, represent(s) a halogen atom, sometimes exist at least initially as a hydrohalide addition salt at the site of the para amino nitrogen. However, these hydrohalide salts readily dehydrohalogenate upon recrystallization or even merely upon standing. Because of this instability, their use is not generally preferred. However, regardless of the existence of a given material as a hydrate or hydrohalide addition salt, or of the ratio of complexing in the instance of a complex, all of such materials are comprehended within the definition hereinabove of thiazolium compound and can be employed for the useful purposes of the present invention.

The products of the present invention are typically crystalline solid materials at room temperature. They are prepared in accordance with the reaction sequence illustrated by the following equation.

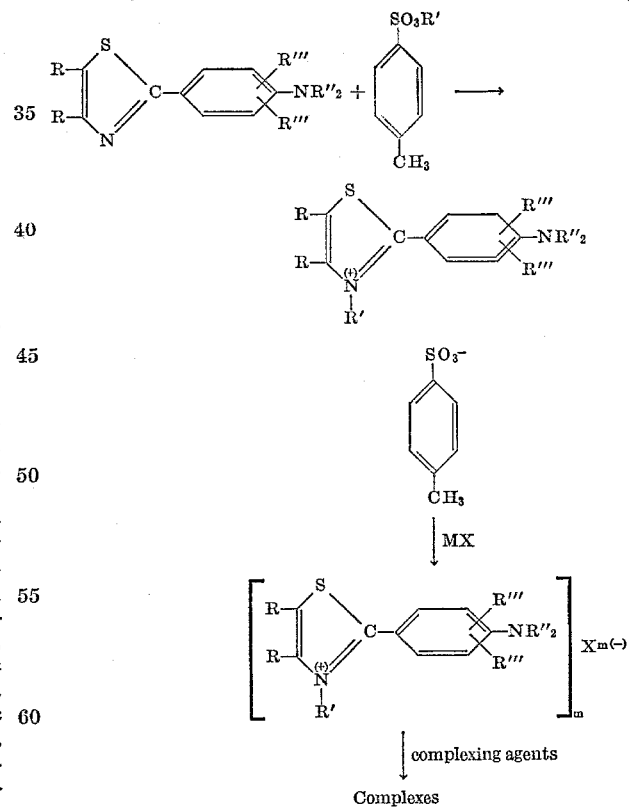

Hence, the products of Formula I wherein X represents p-toluenesulfonate are prepared first, and from them, the remaining products of Formula I are synthesized. The complexes are prepared by reacting the corresponding products of Formula I with the appropriate complexing agent.

The first step of the reaction sequence, the reaction of the thiazole compound and the primary lower-alkyl p-toluenesulfonate, is carried out in conventional procedures for quaternization. The reaction can be carried out in the presence of a suitable organic liquid as a reaction medium; the identity of such medium, if employed, is not critical, although a polar substance is generally preferred, most typically, nitrobenzene or an excess amount of the primary loweralkyl p-toluenesulfonate reactant is employed. Equimolecular proportions of the reactants are consumed in the reaction; however, complete quaternization of the thiazole compound is more readily assured by the use of a slight excess of the primary loweralkyl p-toluenesulfonate. Therefore, it is preferred to employ one molecular proportion of thiazole and from 1.2 to 1.5 molecular proportions of the primary loweralkyl p-toluenesulfonate. The reaction goes forward at temperatures of from 100° to about 160° C. The resulting p-toluenesulfonate product, a material of Formula I wherein X represents p-toluenesulfonate, is separated from the reaction mixture in conventional procedures. Most typically, the reaction medium is removed by evaporation under subatmospheric pressure to obtain the product as a residue. This product residue can be purified by conventional procedures such as recrystallization. Alternately, the product of the quaternization is not separated from the reaction mixture but is reacted in situ with the MX compound to prepare the other products of Formula I.

The reaction with the MX compound and the p-toluenesulfonate product initially prepared represents the second step of the reaction sequence. This step, in which all remaining products of Formula I are prepared, is conducted in accordance with standard procedures for the exchange of anions. In this step, the MX reactant is a metal ("M") salt having the desired X anion. The identity of the metal is not critical, but sodium and potassium salts are most conveniently employed. The reaction goes forward readily at temperatures of a wide range, limited only by such readily apparent factors as, at lower limits, freezing of the reaction mixtures, and, at upper limits, decomposition of one of the reactants or the resulting product. Generally, though, it is preferred to conduct the reaction at temperatures of from 90 to 100° C. A reaction medium is preferably employed. It is desirable that both reactants be soluble in the medium; therefore, water or a loweralkanol is typically employed. The reaction consumes the reactants in amounts representing stoichiometric proportions, and, in the instance wherein the desired product is essentially insoluble in the reaction medium employed, the employment of the reactants in amounts representing such proportions is adequate and gives good results. However, in the instance wherein the desired product is soluble to a greater or lesser extent in the reaction medium it is preferred to use an excess of the metal salt reactant, such as, for example, a tenfold excess, in order that the product is forced, by the presence of the excess metal salt anion, to precipitate in the reaction mixture. The precipitated product is then readily separated by filtration. A by-product metal p-toluenesulfonate salt is produced in the course of the reaction. This by-product typically remains dispersed in the reaction medium and is separated on the filtration step. The separated product is purified, when desired, by conventional procedures, typically recrystallization.

In the third step of the reaction sequence, those products of the present invention which are complexes are prepared by reacting the corresponding product of Formula I with the desired complexing agent, that is, phenolic compound, urea compound, or metal salt compound. The reaction is conveniently carried out by contacting the reactants in an inert liquid reaction medium. Suitable reaction media include water; the loweralkanols such as methanol, ethanol, and isopropanol; and the loweralkyl ketones, such as acetone and methyl ethyl ketone. The reaction goes forward under temperatures of a wide range, but is preferably carried out at temperatures of from about 20° C. to the boiling temperature of the reaction medium employed.

The reaction proceeds with the production of some of the desired product when the reactants are employed in any amounts. When it is desired to prepare a product in which the complex is of a given ratio, it is preferred to employ the reactants in approximately those amounts which are consumed in the preparation of the given ratio of complex, or in amounts which represent a slight excess of complexing agent. In the instance of a 1:1 complex, equimolecular proportions of the reactants are consumed. In the instance of a 1:2 complex, one molecular proportion of product of Formula I and two molecular proportions of complexing agent are consumed; and in the instance of a 2:1 complex, one molecular proportion of complexing agent and two molecular proportions of product of Formula I are consumed.

In carrying out the reaction, the reactants are mixed and contacted together in any manner, conveniently by adding one reactant to the other reactant in the presence of the reaction medium. Thereafter, the resulting reaction mixture can be maintained for a period of time in the reaction temperature range to complete the reaction, although the reaction ordinarily goes to completion with the completion of the contacting together of the reactants. The product typically appears as a precipitate in the reaction mixture. This product can be separated by filtration or decantation. If desired, the separated product can be purified by washing with inert liquid reaction medium or by recrystallization.

The following examples illustrate the present invention and will enable those skilled in the art to practice the same.

EXAMPLE 1

2-(p-dimethylaminophenyl)-3,4,5-trimethylthiazolium p-toluenesulfonate

A first solution was prepared by dispersing 40 grams of methyl p-toluenesulfonate (0.215 mole) in 50 milliliters of nitrobenzene. A second solution was similarly prepared by dispersing 37.5 grams of 2-(p-dimethylaminophenyl)-4,5-dimethylthiazole (0.16 mole) in 150 milliliters of nitrobenzene and thereafter heating the solution to a temperature of 160° C. Subsequently, the first solution was added to the second solution; the addition was carried out portionwise, so that the temperature of the resulting reaction mixture remained at about 160° C. After the completion of the addition, the reaction mixture was held for 4 hours at a temperature of about 160° C. and the nitrobenzene then removed by steam distillation to obtain the desired 2-(p-dimethylaminophenyl)-3,4,5-trimethylthiazolium p-toluenesulfonate product. The product has a molecular weight of 418.6.

EXAMPLE 2

2-(p-dimethylaminophenyl)-3,4,5-trimethyl-thiazolium iodide

The product obtained as reported in Example 1 was dissolved in hot water and the resulting solution filtered. Potassium iodide (60 grams; 0.36 mole) was added to the filtrate. The addition resulted in the precipitation in the reaction mixture of the desired 2-(p-dimethylaminophenyl)-3,4,5-trimethylthiazolium iodide product. The product was separated by filtration and the separated product recrystallized from methanol. The recrystallized material was found to melt at 225–226° C.

Elemental analysis of the product was made. The results were as follows:

Calculated (percent): C, 44.92; H, 5.12; I, 33.91.
Found (percent): C, 44.9; H, 5.32; I, 33.42.

EXAMPLE 3

2-(p-dimethylaminophenyl-3,4,5-trimethyl-thiazolium chloride 2-(p-dimethylaminophenyl)-3,4,5 - trimethylthiazolium p-toluenesulfonate and sodium chloride were reacted in accordance with the procedures of Example 2 to obtain 2-(p-dimethylaminophenyl) - 3,4,5 - trimethylthiazolium chloride. The product has a molecular weight of 282.9.

EXAMPLE 4

2-(p-dimethylaminophenyl)-3,4,5-trimethylthiazolium chloride 1:1 complex with zinc chloride A first solution of zinc chloride (14 grams; 0.105 mole) and 50 milliliters of methanol was added portionwise at room temperature to a second solution of 2-(p-dimethylaminophenyl) - 3,4,5 - trimethylthiazolium chloride (20 grams; 0.07 mole) and 100 milliliters of methanol. The addition resulted in the precipitation in the reaction mixture of the desired 2-(p-dimethylaminophenyl)-3,4,5-trimethylthiazolium chloride 1:1 complex with zinc chloride. The product was separated by filtration and the separated product purified by recrystallization from methanol. The purified product was found to melt at 177–179° C.

In view of the foregoing teachings and examples, those skilled in the art will be enabled to prepare all of the products of the present invention. Other representative products include those set forth in the following table.

| Name of product | Identifying characteristic of product |
| --- | --- |
| 2-(p-dimethylaminophenyl)-3,4,5-trimethylthiazolium bromide. | M.W., 327.3. |
| 2-(p-dimethylaminophenyl)-3,4,5-trimethylthiazolium bromide 1:1 complex with cupric bromide. | M.W., 550.7. |
| 2-(p-dimethylaminophenyl)-3,4,5-trimethylthiazolium iodide 1:1 complex with cuprous iodide. | M.W., 564.8. |
| 2-(p-dimethylaminophenyl)-3,4-dimethylthiazolium p-toluenesulfonate. | M.W., 372.5. |
| 2-(p-dimethylaminophenyl)-3,4-dimethylthiazolium iodide. | M.P., 208–210° C. |
| 2-(p-dimethylaminophenyl)-3,4-dimethylthiazolium sulfate. | M.W., 562.8. |
| 2-(p-dimethylaminophenyl)-3-methyl-4,5,6,7-tetrahydrobenzothiazolium iodide. | M.P., 218–219° C. |
| 2-(2,5-dichloro-4-isobutylaminophenyl)-5-methyl-3-ethylthiazolium valerate 1:1 complex with manganese valerate. | M.W., 674.6. |
| 2-(3-methyl-4-dipropylaminophenyl)-3,4,5-trimethylthiazolium iodide. | M.W., 444.4. |
| 2-(2-bromo-5-methoxy-4-dimethylaminophenyl)-3,4,5-trimethylthiazolium oleate 1:1 complex with ferric oleate. | M.W., 1538.0. |
| 2-(3,5-dimethyl-4-dimethylaminophenyl)-3,4-dimethylthiazolium bromide 2:1 complex with cupric bromide. | M.W., 906. |
| 2-(p-dimethylaminophenyl)-3-methylcycloocta-thiazolium bromide. | M.W., 381.4. |
| 2-(p-dimethylaminophenyl)-4,5-dimethyl-3-isobutylthiazolium iodide 1:2 complex with urea. | M.W., 536.5. |
| 2-(p-dimethylaminophenyl)-3,4,5-trimethylthiazolium chloride 1:1 complex with ferrous chloride. | M.W., 409.6. |
| 2-(p-dimethylaminophenyl)-3,4,5-trimethylthiazolium p-toluenesulfonate 1:1 complex with urea, hemihydrate. | M.P., 167–168.5° C. |
| 2-(p-dimethylaminophenyl)-4,5,6,7-tetrahydro-3-methylbenzothiazolium p-toluenesulfonate. | M.W., 444.6. |
| 2-(p-dimethylaminophenyl)-4,5,6,7-tetrahydro-3-methylbenzothiazolium iodide 1:1 complex with bismuth iodide. | M.W., 990.1. |
| 2-(p-dimethylaminophenyl)-4,5-diethyl-3-n-propylthiazolium salicylate. | M.W., 440.7. |
| 2-(p-dimethylaminophenyl)-4,5-diethyl-3-n-propylthiazolium salicylate 1:1 complex with bismuth salicylate. | M.W., 1061. |
| 2-(p-diethylaminophenyl)-4,5-dimethyl-3-n-butylthiazolium chloride. | M.W., 353. |
| 2-(p-dimethylaminophenyl)-5-n-butyl-3,4-dimethylthiazolium formate 1:1 complex with guanidine hydrochloride. | M.W., 430. |
| 2-(p-dimethylaminophenyl)-3-methylthiazolium carbonate 1:1 complex with ferric carbonate. | M.W., 790.4. |
| 2-(p-diethylaminophenyl)-3,4,5-trimethylthiazolium butyrate 1:1 complex with m-cresol. | M.W., 470.7. |
| 2-(3-methyl-4-dimethylaminophenyl)-3-methylcycloheptathiazolium dihydrogen phosphte 1:1 complex with stannous phosphate. | M.W., 944.5. |
| 2-(p-dimethylaminophenyl)-3-methylthiazolium acetate 1:1 complex with o-methoxyphenol. | M.W., 402.5. |
| 2-(p-dimethylaminophenyl)-3-methylthiazolium iodide 1:1 complex with p-iodophenol. | M.W., 566.3. |
| 2-(p-diethylaminophenyl)-3,4-dimethylthiazolium bromide 2:1 complex with thiourea. | M.W., 758.8. |
| 2-(p-dimethylaminophenyl)-3,4,5-trimethylthiazolium chloride 1:1 complex with biuret. | M.W., 386. |
| 2-(p-dimethylaminophenyl)-3-methylthiazolium iodide 1:1 complex with resorcinol. | M.W., 456.4. |
| 2-(p-dimethylaminophenyl)-4,5,6,7-tetrahydro-3-ethylbenzothiazolium hydrogen sulfate 1:1 complex with phenol. | M.W., 446.6. |
| 2-(2,5-dichloro-4-dimethylaminophenyl)-3-methylthiazolium benzoate 1:1 complex with guanidine. | M.W., 468.4. |
| 2-(p-dimethylaminophenyl)-4-n-propyl-3-methylthiazolium lactate 1:1 complex with manganese lactate. | M.W., 583.6. |
| 2-(2-methoxy-4-dimethylaminophenyl)-3,4-dimethylthiazolium bromide 1:1 complex with pyrocatechol. | M.W., 453.4. |
| 2-(p-dimethylaminophenyl)-3,4,5-trimethylthiazolium hydrogen sulfate 1:1 complex with pyrogallol. | M.W., 470.6. |
| 2-(p-dimethylaminophenyl)-3-methylthiazolium p-toluenesulfonate 1:1 complex with hydroquinone. | M.W., 500.6. |

The products of the present invention are useful as agents to regulate the growth of plants. Accordingly, they can be employed as herbicides, as fungicides, and as bactericides. In such application, the unmodified products can be employed. Generally though, it is preferred to employ the products in the form of a composition comprising the product or products and one or more adjuvants, such as water, organic solvents, surface active agents, and the like. As herbicides, they are effective for the control of such plants as crabgrass and barnyard grass. In representative operations, 2-(p-dimethylaminophenyl)-3,4-dimethylthiazolium iodide was dispersed in water to obtain an aqueous treating composition containing 4000 parts thereof per million parts by weight of ultimate composition. Plots of young crabgrass plants were sprayed to the point of runoff with this composition, and the sprayed plants held for a period of about two weeks under good agricultural conditions. Other plots of young crabgrass plants were left untreated to serve as a control and held for the same period under the same conditions. At the end of this period, observation of the treated plots showed substantially complete kill and control of the growth of crabgrass, whereas in the control plots, the plants were thriving and in good health.

The products of the present invention are also useful as agents to improve the health of warm-blooded animals. In one embodiment, the products are incorporated in animal feeds or drinking water; in such usage, the products improve the growth characteristics of the animals, especially by controlling the organisms which are internal parasites upon the animals. In another embodiment, the control of these parasites can also be achieved by contacting the parasites in their infective phase outside of the host animal body.

The thiazole compounds which are employed as starting materials to prepare the products of the present invention are themselves prepared in known procedures. In these procedures, an alpha-haloketone of the following formula:

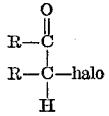

is condensed with a para-aminothiobenzamide compound of the formula:

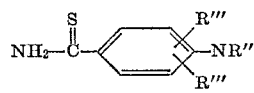

The condensation is carried out by reacting the alpha-haloketone with the para-aminothiobenzamide in the presence of an alkali metal acetate. The reaction is conveniently carried out in the presence of an organic liquid as a reaction medium; suitable such media include the alkanols, glycols, and glycol ethers. The reaction consumes the reactants and alkali metal acetate in amounts representing equimolecular proportions of each of the alpha-haloketone, para-aminothiobenzamide, and alkali metal acetate. The reaction goes forward readily at temperatures of from about room temperature to the boiling temperature of the reaction medium employed. The resulting thiazole starting material is separated from the reaction mixture in conventional procedures. Typically, solvent is removed from the reaction mixture by evaporation under subatmospheric pressure and the resulting residue, comprising the desired product and alkali metal by-product salt, washed with water to separate the desired product as a residue. This product residue can be purified in conventional procedures, typically by recrystallization from a suitable solvent, such as a loweralkanol.

I claim:

1. Complex of (A) a thiazolium compound of the formula

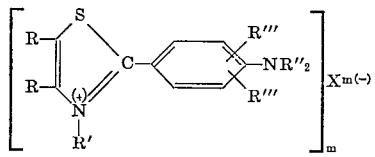

wherein X represents a pharmaceutically-acceptable anion; each R independently represents hydrogen or loweralkyl, or both R moieties, taken together, represent straight chain alkylene being of from 3 to 6, both inclusive, carbon atoms; R' represents primary loweralkyl; each R'' independently represents hydrogen or primary loweralkyl; each R''' independently represents hydrogen, bromo, chloro, methoxy or methyl; and $m$ represents an integer equal to the valence of the anion X; and (B) a metal salt compound of the formula $$M_aY_b$$

wherein M represents copper$^{(+)}$, copper$^{(++)}$, iron$^{(++)}$, iron$^{(+++)}$, antimony$^{(+++)}$, bismuth$^{(+++)}$, tin$^{(++)}$, manganese$^{(++)}$, zinc$^{(++)}$ or cadmium$^{(++)}$; Y represents a pharmaceutically-acceptable anion; and each of $a$ and $b$ represents an integer such that ($a$ times the valence of M) is equal to ($b$ times the valence of Y).

2. The complex claimed in claim 1 which is 2-(p-dimethylaminophenyl) - 3,4,5 - trimethylthiazolium chloride 1:1 complex with zinc chloride.

3. The complex claimed in claim 1 which is 2-(p-dimethylaminophenyl) - 3,4,5 - trimethylthiazolium bromide 1:1 complex with cupric bromide.

4. The complex claimed in claim 1 is 2-(2,5-dichloro-4-isobutylaminophenyl) - 5 - methyl - 3 - ethylthiazolium valerate 1:1 complex with manganese valerate.

5. The complex claimed in claim 1 which is 2-(2-bromo-5 - methoxy - 4 - dimethylaminophenyl) - 3,4,5 - trimethylthiazolium oleate 1:1 complex with ferric oleate.

6. The complex claimed in claim 1 which is 2-(3,5-dimethyl - 4 - dimethylaminophenyl) - 3,4 - dimethylthiozalium bromide 2:1 complex with cupric bromide.

7. The complex claimed in claim 1 which is 2-(p-dimethylaminophenyl) - 3,4,5 - trimethylthiazolium chloride 1:1 complex with ferrous chloride.

8. The complex claimed in claim 1 which is 2-(p-dimethylaminophenyl) - 4,5,6,7 - tetrahydro - 3 - methylbenzothiazolium iodide 1:1 complex with bismuth iodide.

9. The complex claimed in claim 1 which is 2-(p-dimethylaminophenyl) - 4,5 - diethyl - 3 - n - propylthiazolium salicylate 1:1 complex with bismuth salicylate.

10. The complex claimed in claim 1 which is 2-(p-dimethylaminophenyl) - 3 - methylthiazolium carbonate 1:1 complex with ferric carbonate.

11. The complex claimed in claim 1 which is 2-(3-methyl - 4 - dimethylaminophenyl) - 3 - methylcycloheptathiazolium dihydrogen phosphate 1:1 complex with stannous phosphate.

12. The complex claimed in claim 1 which is 2-(p-dimethylaminophenyl) - 4 - n - propyl - 3 - methylthiazolium lactate 1:1 complex with manganese lactate.

References Cited

UNITED STATES PATENTS 3,334,082    8/1967    Reifschneider. _____ 260—96.5

FOREIGN PATENTS 259,613    1/1963    Australia.

OTHER REFERENCES

Erlenmeyer et al.: Helvetica Chemica Acta, vol. 30, pp. 2058–2062 (1947).

ALEX MAZEL, Primary Examiner

R. J. GALLAGHER, Assistant Examiner

U.S. Cl. X.R.

71—90, 82; 260—965, 302, 258, 239.65, 253, 239.1, 300, 999